United States Patent
Pham et al.

(10) Patent No.: US 9,107,034 B2
(45) Date of Patent: Aug. 11, 2015

(54) EMERGENCY BROADCASTING SYSTEMS AND METHODS

(71) Applicant: Honeywell International Inc., Morristown, NJ (US)

(72) Inventors: Hai D. Pham, Eden Prairie, MN (US); Christopher S. Larsen, Rockford, MN (US); Steve Huseth, Plymouth, MN (US)

(73) Assignee: Honeywell International Inc., Morristown, NJ (US)

( * ) Notice: Subject to any disclaimer, the term of this patent is extended or adjusted under 35 U.S.C. 154(b) by 146 days.

(21) Appl. No.: 13/644,965

(22) Filed: Oct. 4, 2012

(65) Prior Publication Data

US 2014/0097939 A1    Apr. 10, 2014

(51) Int. Cl.
*G08B 5/22*    (2006.01)
*H04W 4/02*    (2009.01)
*H04W 4/22*    (2009.01)

(52) U.S. Cl.
CPC . *H04W 4/02* (2013.01); *H04W 4/22* (2013.01)

(58) Field of Classification Search
CPC . H04W 64/00; H04W 88/06; H04M 2242/04; H04M 2242/30; G08B 23/00
USPC .................. 340/8.1, 3.1, 5.1, 12.37
See application file for complete search history.

(56) References Cited

U.S. PATENT DOCUMENTS

| 7,432,805 | B2 * | 10/2008 | Agrawal et al. | 340/539.12 |
| 8,185,618 | B2 * | 5/2012 | Beliles et al. | 709/224 |
| 8,401,515 | B2 * | 3/2013 | Gupta | 455/404.1 |
| 2004/0172277 | A1 * | 9/2004 | Dione | 705/1 |
| 2008/0261554 | A1 * | 10/2008 | Keller et al. | 455/404.1 |
| 2009/0138353 | A1 | 5/2009 | Mendelson | |
| 2010/0074609 | A1 * | 3/2010 | Kasama et al. | 396/147 |

OTHER PUBLICATIONS

Yuanyuan Zeng, et al. "Building Fire Emergency Detection and Response Using Wireless Sensor Networks". Oct. 1, 2009 retrieved from: http://arrow.dit.ie/cgi/viewcontent.cgi?article=1019 &context=ittpapnin on Feb. 5, 2014.
Tabirca T, et al. "A Dynamic Model for Fire Emergency Evacuation Based on Wireless Sensor Networks", Parallel and Distributed Computing, 2009. ISPDC '09. Eighth International Symposium on, IEEE, Piscataway, NJ, USA, Jun. 30, 2009, pp. 29-36, SP031544803, ISBN:978-0-7695-3680-4.
Gandhi S R, et al: FireGuide: Firefighter guide and tracker, 2010 Annual International Conference of the IEEE Egineering in Medicine and Biology Society: (EMBC 2010) : Buenos Aires, Argentina, Aug. 31-Sep. 4, 2010, IEEE, Piscataway, NJ, USA, Aug. 31, 2010, pp. 2037-2040, SPO32108727, ISBN: 978-1-4244-4123-5. p. 2037-p. 2039.

* cited by examiner

*Primary Examiner* — Vernal Brown
(74) *Attorney, Agent, or Firm* — Brooks, Cameron & Huebsch, PLLC

(57) ABSTRACT

Emergency broadcasting systems and methods are described herein. One system includes an anchor access point configured to detect an emergency event and send a message relating to the emergency event to a number of location tags located within a predetermined area of the anchor access point.

20 Claims, 3 Drawing Sheets

EMERGENCY BROADCASTING SYSTEMS AND METHODS

TECHNICAL FIELD

The present disclosure relates to emergency broadcasting systems and methods.

BACKGROUND

Safety in the workplace is becoming an increasing concern for employers and government entities. For example, during critical emergencies (e.g., fires, gas releases, terrorist activities, etc.) in a facility, evacuation routes may become blocked and/or impassable, which may require alternate routes to be used. However, people in the facility may not be able to determine which evacuation routes have become unusable and/or which routes are safe, which can lead to lost time and/or confusion during the evacuation process, and/or increased danger for the people in the facility (e.g., the people may mistakenly move toward the emergency event rather than away from it).

DETAILED DESCRIPTION

Emergency broadcasting systems and methods are described herein. For example, one or more embodiments include an anchor access point configured to detect an emergency event, and send a message relating to the emergency event to a number of location tags located within a predetermined area of the anchor access point.

In some embodiments, the anchor access points can include a number of sensors (e.g., smoke, fire, gas, carbon monoxide sensors) that can detect an emergency event (e.g., fire, smoke, gas leak, concentration of carbon monoxide). The number of anchor access points can utilize the number of sensors to determine if there is an emergency event and a projected path of the emergency event.

The number of anchor access points can send a message to a number of location tags in the projected path of the emergency event. The message can alert a user of the location tag that an emergency event is occurring and that the location tag (e.g., the user) is in the projected path of the emergency event. The location tag can display an evacuation route that can be utilized by the user to evacuate a facility safely and quickly by avoiding the projected path of the emergency event.

In the following detailed description, reference is made to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that process, electrical, and/or structural changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure, and should not be taken in a limiting sense.

As used herein, "a" or "a number of" something can refer to one or more such things. For example, "a number of anchor access points" can refer to one or more anchor access points.

Figure 1:
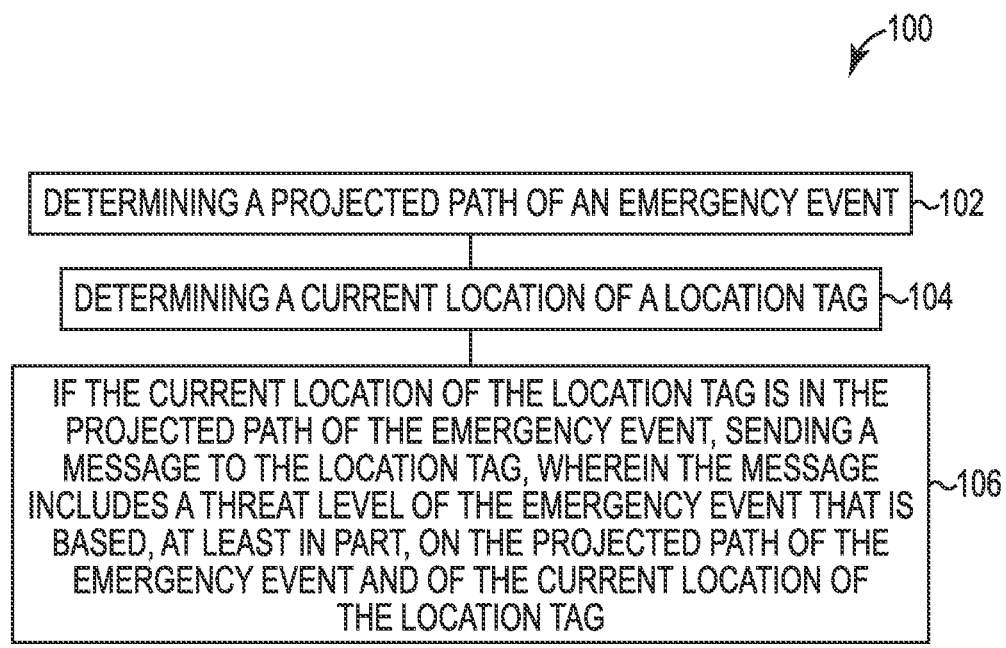
FIG. 1 illustrates a flow diagram of a method for providing emergency broadcasting in accordance with one or more embodiments of the present disclosure.

FIG. 1 illustrates a flow diagram of a method 100 for providing emergency broadcasting in accordance with one or more embodiments of the present disclosure. Emergency broadcasting can alert users of location tags (e.g., location devices, computing devices) that an emergency event is projected to pass through an area that includes a current location of the location tag (e.g., a current location of the user). For example, if a location tag is in the projected path of an emergency event, the location tag can receive a message relating to the emergency event and/or an evacuation route. Conversely, if a location tag is not within the projected path of the emergency event, the location tag may not receive a message relating to the emergency event or evacuation route.

At block 102, method 100 includes determining a projected path of an emergency event. The projected path of the emergency event can include a current position of the emergency event (e.g., the location where the emergency event is detected) and/or a projection (e.g., prediction) of where the emergency event may spread. The projected path can also include a projected area of the emergency event. The projected area can include an area of a particular location that is predicted to be affected by the emergency event as well as the emergency event boundary. The emergency event can include: fire, gas release, terrorist activities, gas leak, smoke, concentration of carbon monoxide, radiation leak, etc.

The projected path of the emergency event can be determined by a number of anchor access points based, at least in part, on data received by a number of sensors. For instance, the projected path can be determined by utilizing the sensor data from the number of anchor access points. The number of sensors can include, but are not limited to: smoke detectors, carbon monoxide detectors, fire detectors, and/or gas detectors. The number of anchor access points can be, for example, anchor access points 216-1, 216-2, . . . , 216-5 as described in connection with FIG. 2.

Each of the number of anchor access points can be communicatively coupled to one or more different anchor access points. For example, a first anchor access point can be communicatively coupled to a second anchor access point. In some embodiments, the number of anchor access can also be coupled to a computing device (e.g., a central computing device).

If an emergency event is detected by a particular anchor access point, the particular anchor access point can communicate the detected emergency event to one or more different anchor access points. For example, a first anchor access point located on a first side (e.g., north side) of a facility can detect an emergency event and communicate the event to a second anchor access point located on a second side (e.g., south side) of the facility. In this example, the second anchor access point can receive the communication relating to the emergency event and determine that the emergency event is currently located on the north side of the facility. In the same example, if the second anchor access point detects the emergency event, the second anchor access point can determine that the emergency event is on a southward projected path, since it was first detected on the north side of the facility and later detected on the south side of the facility. In addition, each of the anchor access points can send and/or receive messages relating to an emergency event. The messages can include, for example, the sensor data.

The receipt of communication that indicates an emergency event from adjacent anchors could also be used an anchor access point to begin measuring and/or communicating a number of sub-alarm-threshold values to other anchor points to allow development of a more precise boundary around the hazard. The sub-alarm threshold values can be measured by altering the sensitivity of the number of sensors. For example, if a first anchor access point receives a communication that a second anchor access point has detected a particular emergency event, the first anchor access point can increase the sensitivity of a sensor used to detect the particular emergency event in order to communicate the measured data using the sensor with increased sensitivity.

The messages relating to the emergency event (e.g., the sensor data) that are sent and/or received by the number of anchor access points can include information that can affect the projected path of the emergency event. For example, the messages can include weather data (e.g., weather predictions) that may affect the projected path of the emergency event. For example, the weather data can indicate that wind can be in a direction that can push a gas release in the same direction. The messages can also include location information relating to a number of structural features (e.g., landmarks). In some cases, the number of structural features can affect the projected path of the emergency event. For example, a structural feature can be susceptible to a particular emergency event and can increase a threat level of the emergency event. In this example, the structural feature can be a fuel container that can increase the threat of a fire in the area of the fuel container.

The messages can also include a variety of information relating to the emergency event and/or the projected path of the emergency event. For example, the messages can include a projection of how fast a particular emergency event is spreading. The projection can be determined by, for example, using a change in time from the detection of the emergency event at a first anchor access point to the detection of the emergency event at a second anchor access point that is a known distance from the first anchor access point. Further, the messages can include an initial time the emergency event is detected, and an end time when the emergency event is no longer detected.

The number of anchor access points can utilize the information from the messages to determine a projected path of the emergency event. The projected path can be utilized to notify users that are near and/or in the projected path of the emergency event of the emergency event and/or to determine an evacuation route.

At block 104, method 100 includes determining a current location of a location tag. The current location of the location tag can be determined utilizing a number of location determination techniques (e.g., triangulation). For instance, the number of anchor access points can receive location information from the location tag. The location information can include, for example, a distance, direction, and/or angular information from the number anchor access points. The location tag can be, for example, one of the location tags 218-1, 218-2, . . . , 218-4 described in connection with FIG. 2.

The location information received from the location tag can be utilized in a location determination technique to determine the location of the tag. For example, a first and a second anchor access point can each receive location information from the tag. The location information can be sent to either of the first and/or second anchor access point. In this example, the location information, along with information regarding the location of the first and second anchor access point, can be used to determine the current location of the tag through a triangulation technique. The location information can also be collected using other forms of location identification (e.g., global positioning systems), and the location information can be sent to each of the anchor access points to determine the current location of the location tag.

At block 106, method 11 includes sending a message to the location tag if the current location of the tag is in the projected path of the emergency event, wherein the message includes a threat level of the emergency event that is based, at least in part, on the projected path of the emergency event and the current location of the location tag. For instance, the number of anchor access points can determine the current location of the location tag and determine if the current location is in the projected path of the emergency event. For example, the location tag can have a determined current position that is currently in (e.g., being affected, predicted to be affected) the predicted path of the emergency event. If it is determined that the location tag is in the projected path of the emergency event, then the message can be sent to the location tag. If it is determined that the location tag is not in the projected path of the emergency event, the message may not be sent to the location tag.

The threat level can be determined by the number of anchor access points based on the projected path of the emergency event (e.g., on the current location of the location tag within the projected path). For example, if the current location of the location tag is near an edge (e.g., boundary) of the projected path the threat level can be a low threat level since there is a chance the emergency event may not affect a user of the location tag to a high degree. In another example, if the current location of the location tag is close to the middle of the projected path the threat level can be a high threat level since there is a better chance that the emergency event will affect the user of the location tag.

The threat level can also be determined based, at least in part, on an intensity and/or danger of the emergency event within the projected path. For example, an intensity of the emergency event can be greater (e.g., increase danger to users) closer to the middle of the projected path compared to the intensity near the edge of the projected path. In this example, the threat level can be greater for location tags that are closer to the middle of the projected path of the emergency event.

The threat level can also be determined based, at least in part, on a classification of the emergency event. For example, the classification can include a type of event, such as: a fire, a gas leak, an explosion, build-up of carbon monoxide, etc. The classification can be determined by the number of anchor access points (e.g., by the sensors of the anchor access points).

The threat level can also be determined based, at least in part, on a distance of the location tag from the current position of the emergency event. For example, the threat level for a first location tag closer to an anchor access point that is currently detecting the emergency event can be higher compared to the threat level for a second location tag that is further away from the anchor access point that is currently detecting the emergency event. In this example, the first location tag and the second location tag can both be in the projected path of the emergency event, but the first location tag can have a higher threat level since the user of the first location tag may need to evacuate more quickly compared to the user of the second location tag.

In addition, the threat level can be determined based, at least in part, on a projected time of arrival of the emergency event. The projected time of arrival can be the time the emergency event is predicted to reach a particular location tag. For example, the anchor access point can determine the projected time of arrival based on the distance of the location tag from the emergency event, the projected path of the emergency event, and the speed of the emergency event.

Furthermore, the threat level can be determined based, at least in part, on a number of structural features of the facility. The threat level can increase if the current location of the location tag is in an area that may include a structural feature that can increase the intensity of the emergency event. For example, if the emergency event is a fire and the current location of the location tag is near a feature and/or structure of the facility that stores explosive/flammable material, then the threat level sent to the location tag could be increased.

In some embodiments, the location tag can display the threat level when an emergency event is detected and the location tag is in the projected path of the emergency event. The number of anchor access points can dynamically (e.g., continuously, repeatedly) update the threat level displayed on the location tag based on the number of factors as described herein. The number of anchor access points can detect movement of the location tag and send an update of the threat level. The update of the threat level can indicate whether the user of the tag is evacuating in a direction that has a relatively higher threat level or in a direction that has a relatively lower threat level. By receiving updates of the threat level with changes in location, the location tag can be used to dynamically determine the safest evacuation route based on the projected path of the emergency event. The updates can be received and displayed on the location tag and/or received an delivered as an audio tone and/or warning. There can also be a combination of a display and audio warning in case the emergency affects the visual capability of the user. For example, the smoke from a fire could affect a user's capability of reading the visual display of the location tag.

In some embodiments, the location tag can display an evacuation route that has a lowest threat level. For example, the anchor access points can determine a lowest threat level evacuation route based on the projected path of the emergency event and send an indication of the lowest threat level evacuation route that can be displayed on a display screen of the location tag. The lowest threat level evacuation route can be sent to the location tag as a map within a message. The map can be displayed on the location tag to indicate the lowest threat level evacuation route.

Figure 2:
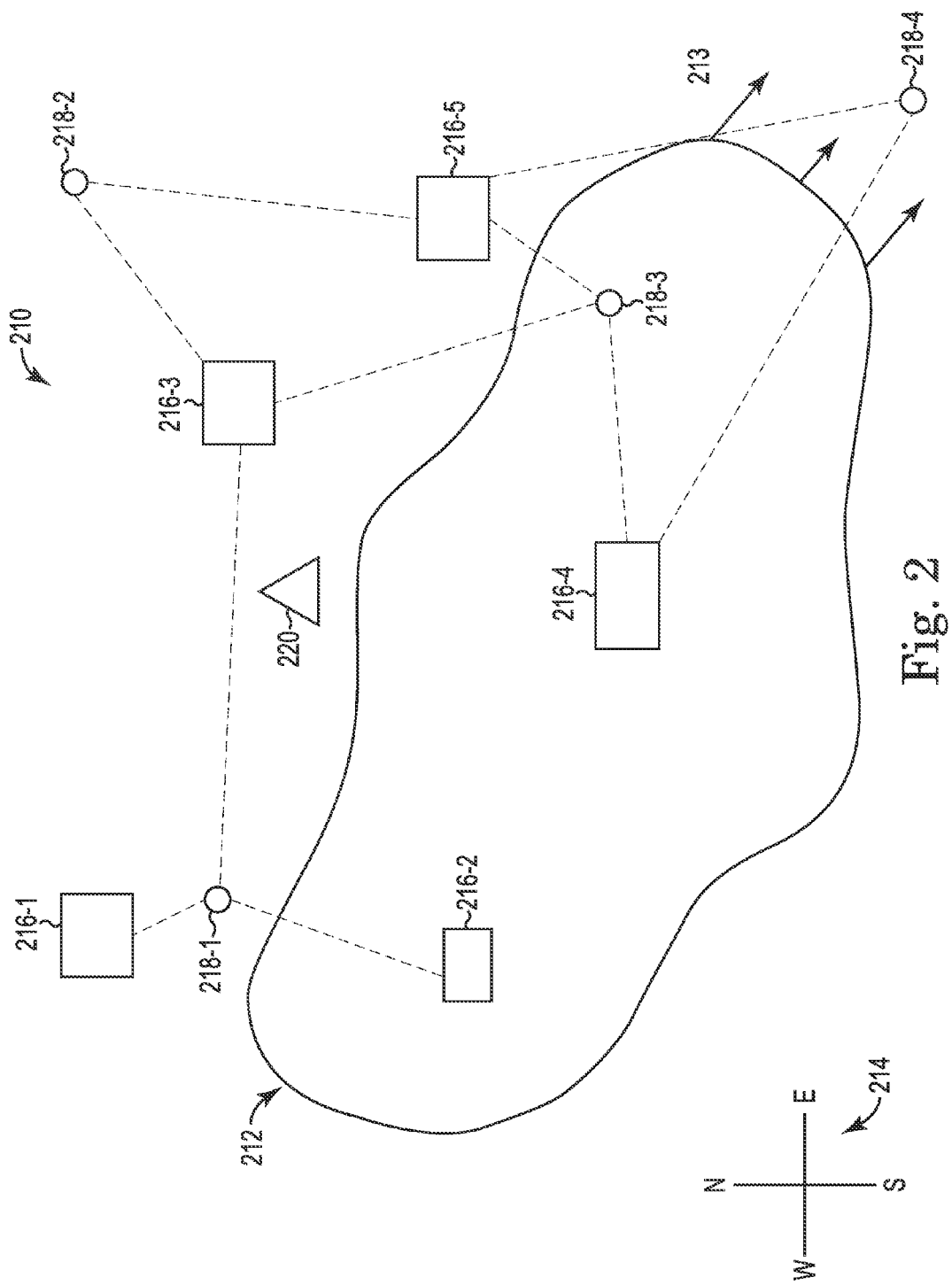
FIG. 2 illustrates an example emergency broadcasting system in accordance with one or more embodiments of the present disclosure.

FIG. 2 illustrates an example emergency broadcasting system 210 in accordance with one or more embodiments of the present disclosure. The system 210 can represent a facility (e.g., workplace facility, campus). Compass 214 can represent coordinate directions of the workplace facility.

Throughout the facility there can be a number of anchor access points (e.g., 216-1, 216-2, . . . , 216-5). Although the embodiment illustrated in FIG. 2 includes five anchor access points, embodiments of the present disclosure are not limited to a particular number of anchor access points.

The number of anchor access points can include a number of sensors that can detect a variety of emergency events (e.g., fire, gas release, terrorist activities, gas leak, smoke, concentration of carbon monoxide, radiation leak) and data associated with the emergency event. The type of sensors that are utilized can be dependent on the workplace facility. The number of anchor access points can each be communicatively coupled to one or more of the other anchor access points. For example, anchor access point 216-1 can be communicatively coupled to anchor access point 216-2. In this example, anchor access point 216-1 can send and receive messages from anchor access point 216-2.

The number of anchor access points can be utilized to determine a current location of a number of location tags (e.g., 218-1, 218-2, . . . , 218-4). Although the embodiment illustrated in FIG. 2 includes four location tags, embodiments of the present disclosure are not limited to a particular number of location tags.

The number of anchor access points can use a location determination technique such as triangulation to determine the current location of the number of location tags. For example, anchor access point 216-1 can receive a signal from location tag 218-1 and determine a distance and an angle of a direction of location tag 218-1 from anchor access point 216-1 based on the signal strength of the location tag 218-1. In addition, anchor access point 216-2 can receive a signal from location tag 218-1 and determine a distance and the angle of the direction based on the signal strength of the location tag 218-1. If anchor access points 216-1 and 216-2 are communicatively coupled, they can utilize the distance and the angle of the direction data in a triangulation technique to determine the current location of location tag 218-1.

Communicatively coupling the number of anchor access points can enable each of the number of anchor access points to share information (e.g., messages and/or sensor data relating to the emergency event, messages relating to location) with each of the other anchor access points. The anchor access points can utilize the shared information to determine a projected path and/or projected area of an emergency event 212. For example, in the embodiment illustrated in FIG. 1, the emergency event can be detected at a first time by anchor access point 216-2 and then detected at a second time by anchor access point 216-4. If the first time is earlier than the second time, then a determination can be made by the anchor access points 216-4, 216-2 that the projected path of the emergency event is in a direction of the anchor access point 216-4 (e.g., southeast). The arrows 213 can indicate the direction of the projected path of the emergency event 212 (e.g., southeast).

If the current location of a location tag is in the projected path of emergency event 212, a message relating to emergency event 212 can be sent to the location tag from one or more of the anchor access points. If the current location of a location tag is not in the projected path of emergency event 212, a message relating to the emergency event 212 may not be sent to the location tag from any of the anchor access points.

Based on the projected path of the emergency event 212, each of the number of location tags can receive a different message or no message from the number of anchor access points. For example, the message can include a threat level that is different for each of the number of location tags. The threat level can be based on a number of factors, as previously described herein (e.g., speed of emergency event, classification of emergency event, current location of the location tag, weather patterns).

As an example, the location tag 218-1 can receive a message with a medium threat level. In this example, it can be determined by anchor access point 216-2 and anchor access point 216-1 that the location tag 218-1 is near the edge of the emergency event 212, but not in the emergency event 212.

As an additional example, it can be determined by anchor access point 216-2 and anchor access point 216-1 that the location tag 218-1 is not in the projected path of the emergency event 212. Accordingly, anchor access points 216-2 and 216-1 may determine not to send a message to location tag 218-1. Further, the message may not be sent to location tag 218-1 if it is determined that the location tag 218-1 is at a safe distance from the emergency event and the projected path is moving away from the location tag 218-1.

It can also be determined that a structural feature of the facility (e.g., structural feature 220) within a predetermined radius of the anchor access points can increase the threat level of the area. For example, if the emergency event is a fire and the structural feature 220 is a storage for a flammable substance (e.g., gasoline), it can be determined that since the anchor access points are located within the predetermined radius of the structural feature, the message to the location tag 218-1 should be a high threat level instead of a medium threat level or not sending a message to location tag 218-1.

As an additional example, the location tag 218-2 may not receive a message from the anchor access points. For example, if there is a determination that the location tag 218-2 is not in the projected path of the emergency event 212, there may not be a message sent to the location tag 218-2. In some cases not sending a message to a location tag that is not in the projected path of the emergency event 212 can prevent unnecessary panic from users of the location tag that are not in potential danger from the emergency event 212. This can keep evacuation routes clearer by lowering the number of individuals using the evacuation routes. For example, by not forcing individuals to evacuate that are not in danger from the emergency event, it can decrease the number of individuals using the evacuation route.

As an additional example, the location tag 218-3 can receive a message with a high threat level. In this example, the location tag 218-3 is determined to be currently in the projected path and/or in a location where the emergency event is currently being detected by the number of anchor access points. Similarly, the location tag 218-4 can receive a message with a high threat level. The location tag 218-4 is currently located in the projected path of the emergency event 212. As indicated by the arrows 213, the emergency event is projected to travel in a southeast direction toward the location tag 218-4.

An evacuation route that avoids the projected path of the emergency event can be included in the message sent to each of the number of location tags. That is, the evacuation route can be based on the projected path of the emergency event and the location of the location tag.

The evacuation route can be displayed by the location tags in various forms. For instance, in some embodiments, the evacuation route can be communicated to a user of the location tags by increasing and/or decreasing the threat level displayed on the tag. For example, if the number of anchor access points determine that a particular location tag is moving in a direction with an increased threat level, the anchor access points can send a new message with an updated threat level that is higher than the previous threat level. The user of the particular location tag can use the updated threat levels to determine if a particular evacuation route is a safe direction.

A safest evacuation route can also be determined by the number of anchor access points based on a threat level for a number of locations in the evacuation route. For example, a number of predefined evacuation routes can be analyzed by the number of anchor access points to determine a threat level of a number of locations in the number of predefined evacuation routes. The anchor access points can use the number of threat levels to determine an overall threat level of each of the number of predefined evacuation routes. A lowest threat level evacuation route can be determined to be a safest route and can be sent to a particular location tag. The evacuation route with the lowest threat level can be altered based on changes in the projected path of the emergency event 212 and/or changes in location of the location tag. If the lowest threat level evacuation route changes, a new message can be sent to the particular location tag with an updated lowest threat level evacuation route.

In some embodiments, each of the number of anchor access points can independently determine and send a message with a threat level and evacuation information. For example, each of the number of anchor access points can include a computing device (e.g., computing device 330 as described in connection with FIG. 3) that can determine a current location for the number of location tags, determine a threat level for the current location, and send a message including the threat level to each of the location tags within a predetermined area. For example, a particular anchor access point can detect an emergency event, determine a threat level of the emergency event at the location of a particular location tag, and send a message to the particular location tag if it is within a predetermined area of the anchor access points.

The predetermined area of the anchor access point can include a particular circumference around the anchor access point. The anchor access point can use the predetermined area to notify a number of location tags that are near the location of the emergency event and to not notify location tags that are outside the predetermined area or farther away from the emergency event. For example, if the anchor access point detects an emergency event, only location tags that are within the predetermined area of the anchor access point will receive a message relating to the emergency event. In this same example, location tags that are outside the predetermined area of the anchor access point will not receive the message.

The predetermined area of the anchor access points may be different for different categories of emergency event. For example, a predetermined area for a fire could be a first predetermined area and a predetermined area for a gas leak could be a second predetermined area. This can be determined based on the location of the anchor access point within the facility and/or based on a predicted danger of a particular emergency event at the location of the anchor access point.

In some embodiments, each of the number of anchor access points can be communicatively coupled to a central computing device (e.g., computing device 330 as described in connection with FIG. 3). The central computing device can be utilized to gather information from the number of anchor access points and determine a current location of the number of location tags, determine a threat level for the current location of each of the number of location tags, determine a lowest threat level evacuation route, and send a message including the threat level to each of the location tags.

In some embodiments, each of the number of anchor access points can be communicatively distinct from each of the other anchor access points. For example, the anchor access points would not send communication to other anchor access points in order to determine a current location of the location tags. In another example, the anchor access would not send communication to other anchor access points in order to determine a projected path and/or projected area of the emergency event.

In some embodiments the location tags can utilize other forms of location determination techniques. For example, the location tags can use a global positioning system (GPS) and/or communication with the number of anchor access points to determine the current location. The current location can be communicated to each of the number of anchor access points. By communicating the current location of the location tag to each of the number of anchor access points, the anchor access points can utilize the current location of the location tag when sending a message relating to an emergency event. For example, when a particular anchor access point detects an emergency event, the particular anchor access point can utilize the received current location of the location tag to determine if a message relating to the emergency event should be sent to the location tag.

In some embodiments, each of the number of anchor access points can include a location for the anchor access point within the message relating to the emergency event. For example, if a particular anchor access point detected an emergency event, the particular anchor access point could broadcast a message that includes information of the emergency event as well as the location of the particular anchor access point. In this embodiment, the location tag can use the current location of the location tag and the location of the anchor access point that sent the message to determine how far away the anchor access point is from the current location of the location tag.

In some embodiments, the location tags can determine a distance from each of the number of anchor access points. For example, the location tag can use signal strength and/or time of flight characteristics of the message sent by the anchor access points to determine how far away the location device is from a particular anchor access point. The location tags can use the distance from a particular anchor access point to determine a distance from the emergency event. For example, if an anchor access point detects an emergency event and sends a message to a location tag within a particular distance of the anchor access point, the location tag can determine the distance from the emergency event.

The location tag can also use the distance from the anchor access point to determine if the location tag is moving closer or farther away from the emergency event. In this example, the location tag can update a distance from the anchor access point that is sending the message relating to the emergency event and display a message to the user. The message to the user can notify the user that the user is getting closer or farther away from the anchor access point that is detecting the emergency event. The location tag can also display the distance from a particular anchor access point using an indicator (e.g., display, etc.).

The location tags can also include a number of sensors (e.g., smoke, fire, gas). The number of sensors can collect data relating to the emergency event from the location of the location tag similar to the number of sensors connected to the number of anchor access points as described herein. The data relating to the emergency event that is collected by the number of sensors can be sent to the number of anchor access points and/or a central computing device. The data relating to the emergency event can be utilized by the number of anchor access points and/or central computing system to determine the projected path of the emergency event. For example, the number of anchor access points can receive data relating to the emergency event from a number of location tags to more accurately determine the projected path and/or boundary of the emergency event.

The number of sensors within the location tags can also detect an emergency event before it would be detected by the number of anchor access points. For example, a particular location tag can be closer to the start of an emergency event and send the data relating to the emergency event before the emergency event is detected by an anchor access point. In this example, the anchor access point can receive data relating to an emergency event more quickly than without the number of sensors within the location tags and send messages to other location tags within the determined projected path of the emergency event.

In some embodiments, each of the number of anchor access points can send messages relating to the emergency event and/or location information for each of the number of anchor access points to a central computing device (e.g., computing device 330). The number of location tags can also send current location information to the same or similar central computing device. The central computing device could then utilize the received information to determine the projected path of the emergency event as well as a threat level for each of the number of location tags based on the current location.

In some embodiments, each of the number of anchor access points can include a location for the anchor access point within the message relating to the emergency event. In this embodiment the number of location tags can utilize the location of the anchor access points with the current location of the location tag to determine if the location tag is near the anchor access point. For example, the location tag can determine a current location using GPS. The location tag can receive a message with data relating to an emergency event and a location of the anchor access point that detected the emergency event. The location tag can utilize the current location, emergency event data, and the location of the anchor access point to determine a threat level of the emergency event and/or an evacuation route.

Figure 3:
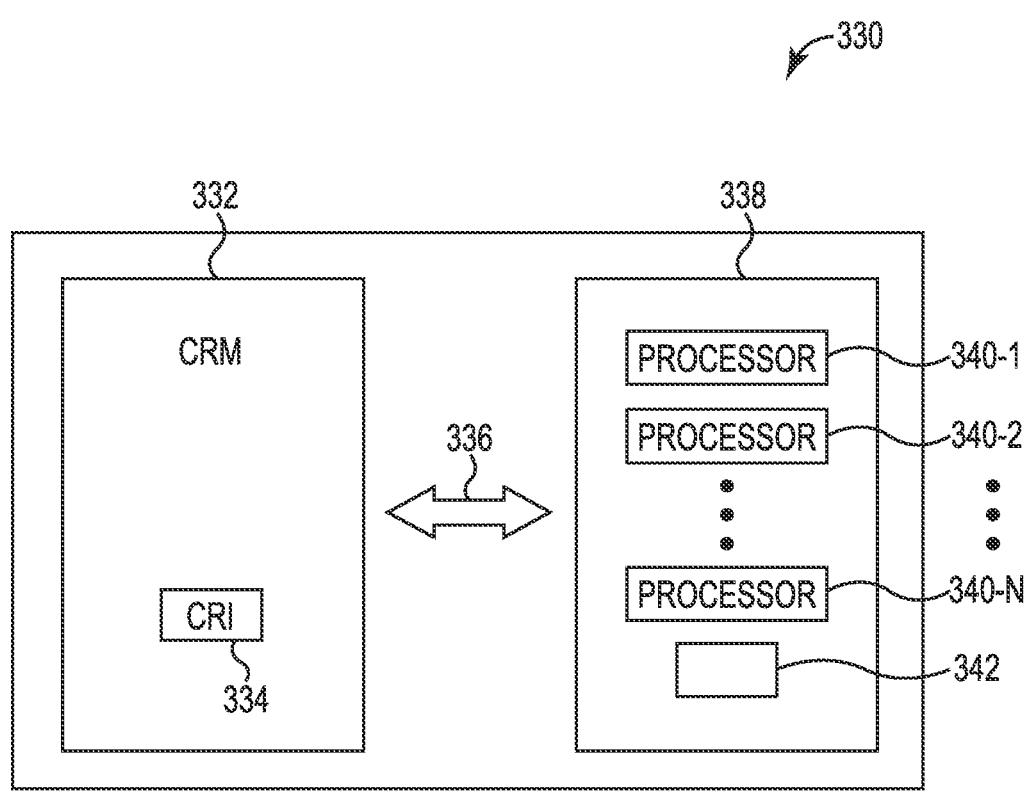
FIG. 3 illustrates a block diagram of an example of a computing device in accordance with one or more embodiments of the present disclosure.

FIG. 3 illustrates a block diagram of an example of a computing device 330 in accordance with one or more embodiments of the present disclosure. The computing device 330, as described herein, can also include a CRM 332 in communication with processing resources 340-1, 340-2, . . . , 340-N. Computer Readable Medium (CRM) 332 can be in communication with a device 338 (e.g., a Java® application server, among others) having processor resources 340-1, 340-2, . . . , 340-N. The device 338 can be in communication with a tangible non-transitory CRM 332 storing a set of computer-readable instructions (CRI) 334 (e.g., modules) executable by one or more of the processor resources 340-1, 340-2, . . . , 340-N, as described herein. The CRI 334 can also be stored in remote memory managed by a server and represent an installation package that can be downloaded, installed, and executed. The device 338 can include memory resources 342, and the processor resources 340-1, 340-2, . . . , 340-N can be coupled to the memory resources 342.

Processor resources 340-1, 340-2, . . . , 340-N can execute CRI 334 that can be stored on an internal or external non-transitory CRM 332. The processor resources 340-1, 340-2, . . . , 340-N can execute CRI 334 to perform various functions. For example, the processor resources 340-1, 340-2, . . . , 340-N can execute CRI 334 to perform a number of functions (e.g., determine a current location of a location tag, determine a projected path of an emergency event, determine a threat level, send a message with the threat level). A non-transitory CRM (e.g., CRM 332), as used herein, can include volatile and/or non-volatile memory. Volatile memory can include memory that depends upon power to store information, such as various types of dynamic random access memory (DRAM), among others. Non-volatile memory can include memory that does not depend upon power to store information. Examples of non-volatile memory can include solid state media such as flash memory, electrically erasable programmable read-only memory (EEPROM), phase change random access memory (PCRAM), magnetic memory such as a hard disk, tape drives, floppy disk, and/or tape memory, optical discs, digital versatile discs (DVD), Blu-ray discs (BD), compact discs (CD), and/or a solid state drive (SSD), as well as other types of computer-readable media.

The non-transitory CRM 332 can also include distributed storage media. For example, the CRM 332 can be distributed among various locations.

The non-transitory CRM 332 can be integral, or communicatively coupled, to a computing device, in a wired and/or a wireless manner. For example, the non-transitory CRM 332 can be an internal memory, a portable memory, a portable disk, or a memory associated with another computing resource (e.g., enabling CRI's to be transferred and/or executed across a network such as the Internet).

The CRM 332 can be in communication with the processor resources 340-1, 340-2, ..., 340-N via a communication path 336. The communication path 336 can be local or remote to a machine (e.g., a computer) associated with the processor resources 340-1, 340-2, ..., 340-N. Examples of a local communication path 336 can include an electronic bus internal to a machine (e.g., a computer) where the CRM 332 is one of volatile, non-volatile, fixed, and/or removable storage medium in communication with the processor resources 340-1, 340-2, ..., 340-N via the electronic bus. Examples of such electronic buses can include Industry Standard Architecture (ISA), Peripheral Component Interconnect (PCI), Advanced Technology Attachment (ATA), Small Computer System Interface (SCSI), Universal Serial Bus (USB), among other types of electronic buses and variants thereof.

The communication path 336 can be such that the CRM 332 is remote from the processor resources e.g., 340-1, 340-2, ..., 340-N, such as in a network relationship between the CRM 332 and the processor resources (e.g., 340-1, 340-2, ..., 340-N). That is, the communication path 336 can be a network relationship. Examples of such a network relationship can include a local area network (LAN), wide area network (WAN), personal area network (PAN), and the Internet, among others. In such examples, the CRM 332 can be associated with a first computing device and the processor resources 340-1, 340-2, ..., 340-N can be associated with a second computing device (e.g., a Java® server).

As described herein, a "module" can include computer readable instructions (e.g., CRI 334) that can be executed by a processor to perform a particular function. A module can also include hardware, firmware, and/or logic that can perform a particular function.

As used herein, "logic" is an alternative or additional processing resource to execute the actions and/or functions, described herein, which includes hardware (e.g., various forms of transistor logic, application specific integrated circuits (ASICs)), as opposed to computer executable instructions (e.g., software, firmware) stored in memory and executable by a processor.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. An emergency broadcasting system, comprising:
    an anchor access point configured to:
        detect an emergency event;
        alter a sensor sensitivity of a number of different anchor access points to detect sub-alarm threshold values based on the emergency event;
        determine a boundary of the emergency event based on received sub-alarm threshold values from the number of different anchor access points; and
        send a message relating to the emergency event to a number of location tags located within the determined boundary of the anchor access point, wherein the anchor access point detects movement of the location tag within the determined boundary and sends an update to the location tag that includes a threat level of the emergency event.

2. The system of claim 1, wherein the anchor access point is configured to determine a current location of the number of location tags.

3. The system of claim 1, wherein the message includes information of structural features that are susceptible to the detected emergency event.

4. The system of claim 1, wherein the message includes a map of the detected emergency event and area surrounding the number of location tags.

5. The system of claim 1, wherein the number of location tags determine a distance from the anchor access point using the signal strength of the message sent by the anchor access point.

6. The system of claim 5, wherein the number of location tags display the distance from the anchor access point.

7. A method for providing emergency broadcasting, comprising:
    determining a projected path of an emergency event;
    altering a sensor sensitivity of a number of different anchor access points to detect sub-alarm threshold values based on the emergency event;
    determining a boundary of the emergency event based on a number of sub-alarm threshold values from the number of different anchor access points; and
    detecting movement of a location tag within the determined boundary;
    determining a current location of the location tag; and
    if the current location of the location tag is in the projected path of the emergency event, sending a message to the location tag, wherein the message includes a threat level of the emergency event that is based, at least in part, on the projected path of the emergency event and the current location of the location tag.

8. The method of claim 7, wherein the message includes an evacuation route that avoids the projected path of the emergency event.

9. The method of claim 7, wherein the message includes an evacuation route based, at least in part, on the projected path of the emergency event.

10. The method of claim 7, wherein determining the projected path of the emergency event includes utilizing sensor data from a number of stationary anchor access points.

11. The method of claim 10, wherein the sensor data includes an initial time the emergency event is detected and an end time when the emergency event is no longer detected.

12. The method of claim 10, wherein the sensor data includes weather data that can affect the projected path of the emergency event.

13. An emergency broadcasting system, comprising:
a number of anchor access points, wherein each of the anchor access points include a number of sensors configured to:
detect data associated with an emergency event;
alter a sensor sensitivity of a number of different anchor access points to detect sub-alarm threshold values based on the emergency event;
determine a projected path of the emergency event based, at least in part, on the data and the sub-alarm threshold values received from the number of different anchor access points;
determine a threat level of the emergency event based, at least in part, on the projected path of the emergency event;
determine a boundary of the emergency event based on a number of sub-alarm threshold values; and
a location tag configured to:
receive the threat level of the emergency event if the location tag is in the projected path of the emergency event, wherein the anchor access point detects movement of the location tag within the determined boundary; and
display the threat level and an evacuation route to avoid the projected path of the emergency event, wherein the evacuation route is based, at least in part, on the location of the location tag.

14. The system of claim 13, wherein the number of anchor access points use the threat level of the emergency event to determine a threat level for each of a number of predefined evacuation routes.

15. The system of claim 13, wherein the number of anchor access points are configured to increase the threat level if the location of the location tag moves in a direction that is closer to an anchor access point that is detecting the emergency event.

16. The system of claim 13, wherein the data associated with the emergency event includes a number of structural features within a predetermined radius of the number of access points.

17. The system of claim 16, wherein the number of structural features increase the threat level of the emergency event.

18. The system of claim 13, wherein the number of anchor access points are configured to determine a current location of the location tag and determine if the current location is in the projected path of the emergency event.

19. The system of claim 18, wherein the threat level is based, at least in part, on the current location of the location tag.

20. The system of claim 18, wherein the location tag is configured to alter the evacuation route based, at least in part, on a change in the projected path of the emergency event.

* * * * *